March 30, 1926.  1,578,629
D. F. BEAUCHAMP
ADJUSTABLE REFLECTOR
Filed March 22, 1924
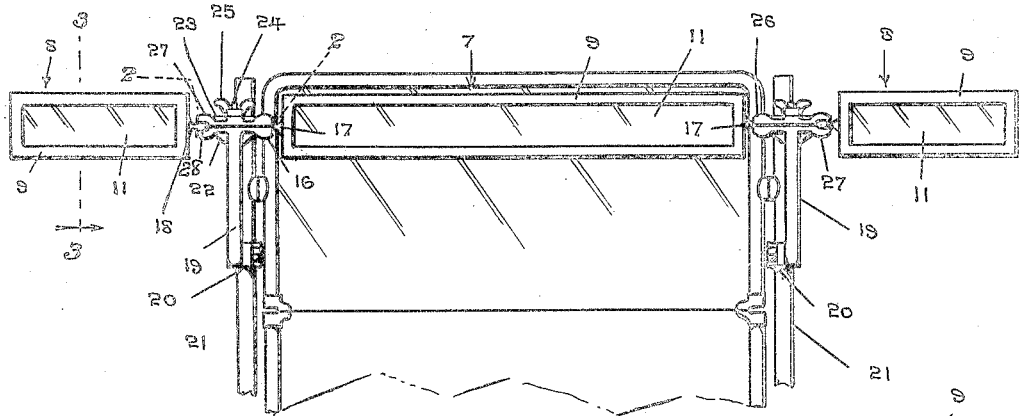
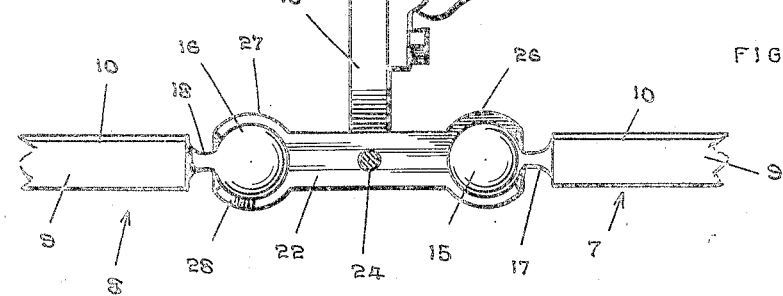
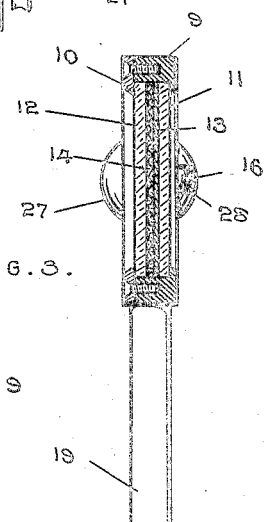
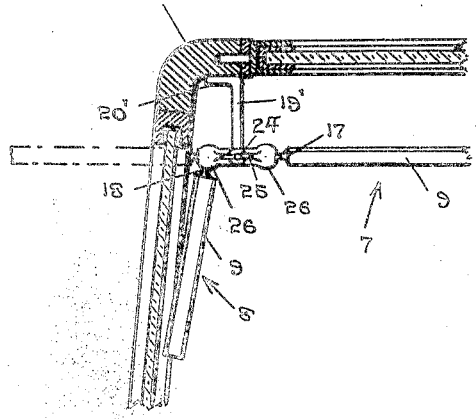
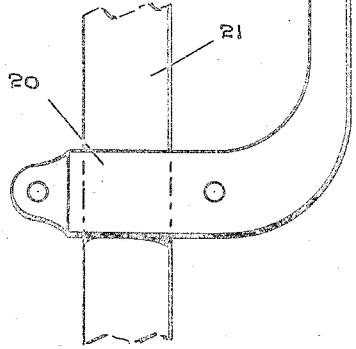
Inventor:
DORA F BEAUCHAMP,
By Monroe C Miller
Attorney.

Patented Mar. 30, 1926.

1,578,629

UNITED STATES PATENT OFFICE.

DORA FAURE BEAUCHAMP, OF FOREST HILLS, NEW YORK, ASSIGNOR OF THIRTY ONE-HUNDREDTHS TO DOROTHEA CALHOUN, OF NEW ORLEANS, LOUISIANA.

ADJUSTABLE REFLECTOR.

Application filed March 22, 1924. Serial No. 701,106.

*To all whom it may concern:*

Be it known that I, DORA F. BEAUCHAMP, a citizen of United States, residing at Forest Hills, in the county of Queens and State of New York, have invented certain new and useful Improvements in Adjustable Reflectors, of which the following is a specification, reference being had therein to the accompanying drawing.

The present invention relates to rear sight mirrors for automobiles and other vehicles, and is particularly an improvement over the adjustable mirror reflectors disclosed in Patent No. 1,276,512, dated August 20, 1918.

It is the object of the invention to provide novel means for mounting rear sight mirrors in front of the operator of an automobile or other vehicle, in order that the mirrors can be adjusted to different angles, so that the operator of the vehicle can conveniently observe other vehicles in rear, the mirrors also being reversible to present either brilliant or subdued reflecting surfaces, the latter being particularly desirable when the sunlight would produce objectionable glare in the eyes of the operator.

A further object is the provision of such a mounting for supporting a central reflector for angular adjustment and reversal about a horizontal axis transversely of the vehicle, and for supporting side reflectors for adjustment angularly upwardly and downwardly, and forwardly and rearwardly, as well as for turning adjustment about their axes, and the mounting is such that the side reflectors can be swung inwardly so as to be disposed inside the side curtains or doors of the vehicle body when the sides of the vehicle body are closed.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawing, wherein—

Figure 1 is an elevation showing the device installed.

Fig. 2 is an enlarged section on the line 2—2 of Fig. 1.

Fig. 3 is a vertical section on the line 3—3 of Fig. 1.

Fig. 4 is a fragmentary plan view of the device, showing a modified form of bracket for use in a closed car.

There are three reflectors or reflector units in the device as shown, namely, the central or main reflector 7, and the side reflectors 8, although, in some instances, the side reflector 8 furthest from the operator can be omitted, but this is optional with the user. The central or main reflector 7 is of a length to extend transversely from one side of the vehicle body to the other side, while the reflectors 8 project from the opposite sides of the vehicle body to give rear sight vision at opposite sides of the vehicle, while the reflector 7 gives rear sight vision through the rear window or over the entire body when the top is folded down.

Each of the reflectors is reversible, having opposite mirror surfaces, and the reflectors are of similar construction, although the central reflector is of longer length than the side reflectors. Each reflector comprises an elongated frame 9 of metal or other suitable material having the removable rim member 10 secured to the frame by screws or other securing elements. Fitted in the frame 9 and held therein by the member 10 are opposite panels or plates 11 and 12 of glass or other transparent material. The inner surface of the panel 11 is coated with silver, mercury or other material, as at 13, giving a highly polished or brilliant reflecting surface, while a dull sheet 14 of fabric or other suitable material is disposed at the inner surface of the panel 12, to give a dull or subdued reflecting surface. Thus, when the panels or plates 11 are presented rearwardly the reflectors will have their brilliant surfaces in position to reflect the light rays from in rear of the vehicle to the eyes of the operator, whereas, when the reflectors are reversed, that is, turned around, the subdued or dull reflecting surfaces are presented rearwardly. This is of advantage when the light is strong so as to produce an objectionable glare or to blind the operator.

In order that the reflectors can be supported, the reflector 7 is provided at its opposite ends with the balls 15, while the reflectors 8 are provided at their inner ends with the balls 16, said balls 15 and 16 being connected with the respective frames 9 by the necks 17 and 18.

Supporting brackets 19 are provided between the reflectors, and, as shown in Figs. 1, 2 and 3, have clamps 20 at their lower ends to embrace the posts 21 of the windshield, so that said brackets extend rearwardly and upwardly from said posts. The brackets have longitudinally split T-heads at their upper ends between the reflectors. The head of each bracket comprises a lower section 22 integral with the bracket and an upper removable section 23. The section 22 has an upstanding screw 24 over which the section 23 is engaged, and a nut 25 is threaded on said screw to clamp the section 24 on the section 22. The nut is preferably a wing nut, or the like, to be conveniently tightened and loosened by hand. The T-head of each bracket is formed at its inner and outer ends, respectively, with the spherical sockets 26 and 27, said sockets being divided in the horizontal plane between the sections 22 and 23 so that the lower and upper portions of the sockets are integral with the respective sections 22 and 23.

Ball and socket connections between the reflectors and brackets are thus provided, the balls 15 of the reflector 7 being fitted in the sockets 26, while the balls 16 of the side reflectors are fitted in the sockets 27. The openings or mouths of the sockets are sufficiently large to permit the necks 17 and 18 to be moved about therein so that the reflectors and brackets can be positioned at different angles relatively to one another, as well as permitting the reflectors to be rotated about their axes or the axes of the necks 17 and 18.

When the clamping nuts 25 are tightened, the balls 15 and 16 are clamped tightly in the sockets, thereby maintaining the reflectors in their adjusted positions. When the sections 23 are loosened, this will permit the reflector 7 to be adjusted to different angles about the longitudinal axis of said reflector which coincides with the axis of the necks 17 and balls 15, said axis being horizontal and arranged transversely of the vehicle. Furthermore, the reflector 7 can be turned around to present either reflecting surface rearwardly. This also applies to the reflectors 8, which can be readily turned around about their axes which coincide with the axes of the necks 18. The reflectors 8, which project from the sides of the vehicle, can be adjusted angularly upwardly and downwardly, as well as forwardly and rearwardly, so as to position said reflectors and enable the operator to look rearwardly at the opposite sides of the vehicle.

The side reflectors 8 can be swung rearwardly so as to be disposed within the closed top of the vehicle when the side curtains or doors are closed. In an open car, the reflectors 8 can thus be adjusted rearwardly and inwardly so as to be disposed at the inner sides of the side curtains, and in a closed car the reflectors 8 can be adjusted inwardly when the windows of the side doors are closed, as seen in Fig. 4. Thus, the sockets 27, which open outwardly to the respective sides of the vehicle, have slots 28 extending from the mouths of the sockets to the rear sides of said sockets toward the opposite sides of the vehicle, to accommodate the necks 18 when the reflectors 8 are swung rearwardly. The side reflectors can thus not only be swung inwardly out of the way of the side curtains or windows, but they may also be brought into the body of the vehicle when the vehicle is left standing, and such side mirrors can be locked within a closed car to prevent said side mirrors being stolen.

When the nuts 25 are tightened, the clamping sections or pieces 23 of the brackets will simultaneously clamp the corresponding balls 15 and 16, instead of having an independent clamp for each ball, thus providing a simple and effective arrangement, inasmuch as two clamping members are sufficient for the three reflectors.

When the reflectors are used in a closed type of automobile, the brackets 19', as shown in Fig. 4, have attaching portions 20' so formed as to be secured to the frame or front corner posts 21' of the body.

Having thus described the invention, what is claimed as new is:—

1. A rear sight device for vehicles, comprising reflectors, a bracket having a longitudinally split T-head composed of separable sections and having sockets at the opposite ends thereof, the reflectors having balls fitted in said sockets, one section of the head being fixed to the bracket, and means for securing said sections of the head together to simultaneously clamp the balls in said sockets.

2. A rear sight device for vehicles, comprising a central elongated reflector to extend transversely between opposite sides of a vehicle, side reflectors to project from the opposite sides of the vehicle beyond the ends of the central reflector, and two brackets between the reflectors having means for securing them to supports of the vehicle at opposite sides of the vehicle, the reflectors having balls at their adjacent ends and each bracket having a pair of sockets receiving the corresponding balls and means for simultaneously clamping said balls in the sockets.

3. A rear sight device for vehicles, comprising an elongated central reflector to extend transversely between opposite sides of a vehicle, side reflectors to project from the opposite sides of the vehicle beyond the ends of the central reflector, two brackets between said reflectors having means for securing them to supports of the vehicle at opposite sides of the vehicle, each bracket having a longitudinally split T-head composed of separable sections and having sockets at the opposite ends thereof, one section of each head being fixed to the corresponding bracket, the reflectors having balls at their adjacent ends fitted in the corresponding sockets of said bracket heads, and means for securing together the sections of each head to simultaneously clamp the corresponding balls in said sockets.

In testimony whereof I hereunto affix my signature.

DORA FAURE BEAUCHAMP.